(12) United States Patent
Tang et al.

(10) Patent No.: US 12,379,544 B2
(45) Date of Patent: Aug. 5, 2025

(54) OPTICAL WAVEGUIDE TERMINATION

(71) Applicant: Taiwan Semiconductor Manufacturing Co., Ltd., Hsinchu (TW)

(72) Inventors: Cheng-Tse Tang, Hsinchu (TW); Chewn-Pu Jou, Hsinchu (TW); Chia-Ju Yu, Hsinchu (TW); Cheng Hsiao, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 205 days.

(21) Appl. No.: 17/855,575

(22) Filed: Jun. 30, 2022

(65) Prior Publication Data

US 2024/0004134 A1    Jan. 4, 2024

(51) Int. Cl.
| | |
|---|---|
| *G02B 6/122* | (2006.01) |
| *G02B 6/132* | (2006.01) |
| *G02B 6/136* | (2006.01) |
| *G02B 6/24* | (2006.01) |
| *G02B 6/30* | (2006.01) |

(52) U.S. Cl.
CPC ........... *G02B 6/243* (2013.01); *G02B 6/1228* (2013.01); *G02B 6/132* (2013.01); *G02B 6/136* (2013.01); *G02B 6/305* (2013.01)

(58) Field of Classification Search
CPC ........ G02B 6/1228; G02B 6/42; G02B 6/036; G02B 6/1221
See application file for complete search history.

(56) References Cited

U.S. PATENT DOCUMENTS

| | | | | |
|---|---|---|---|---|
| 8,891,921 | B2 * | 11/2014 | Sakai | G02B 6/1228 |
| | | | | 385/43 |
| 2020/0057197 | A1 | 2/2020 | Chong et al. | |
| 2021/0003777 | A1 * | 1/2021 | Israel | G02B 6/14 |
| 2021/0055478 | A1 * | 2/2021 | Bian | G02B 6/1228 |
| 2023/0333318 | A1 * | 10/2023 | Bian | G02B 6/1228 |

FOREIGN PATENT DOCUMENTS

| | | |
|---|---|---|
| TW | 201704791 A | 2/2017 |
| TW | 202217381 A | 5/2022 |

* cited by examiner

*Primary Examiner* — Eric Wong
(74) *Attorney, Agent, or Firm* — Seed IP Law Group LLP

(57) ABSTRACT

The present disclosure relates to optical waveguide termination devices. In some embodiments, an optical waveguide termination device is coupled to an end of an optical waveguide. The optical waveguide termination device is a tapered structure. In various embodiments, an optical absorption rate of the tapered structure is increased to enhance a termination efficiency. The optical absorption is increased by highly-doped material, multi-layer structure, different cladding, and periodic structure. The enhancement of the termination efficiency benefits size reduction of the tapered structure.

20 Claims, 11 Drawing Sheets

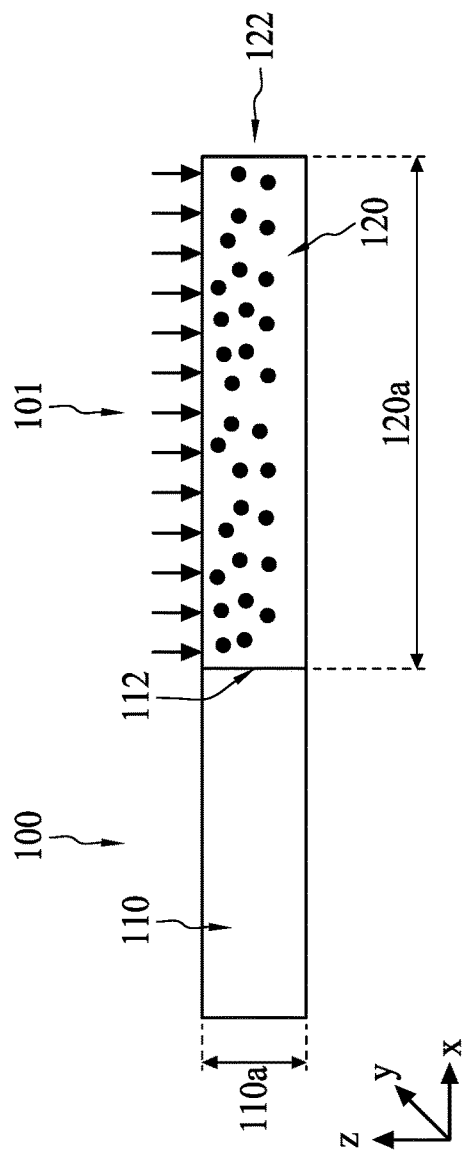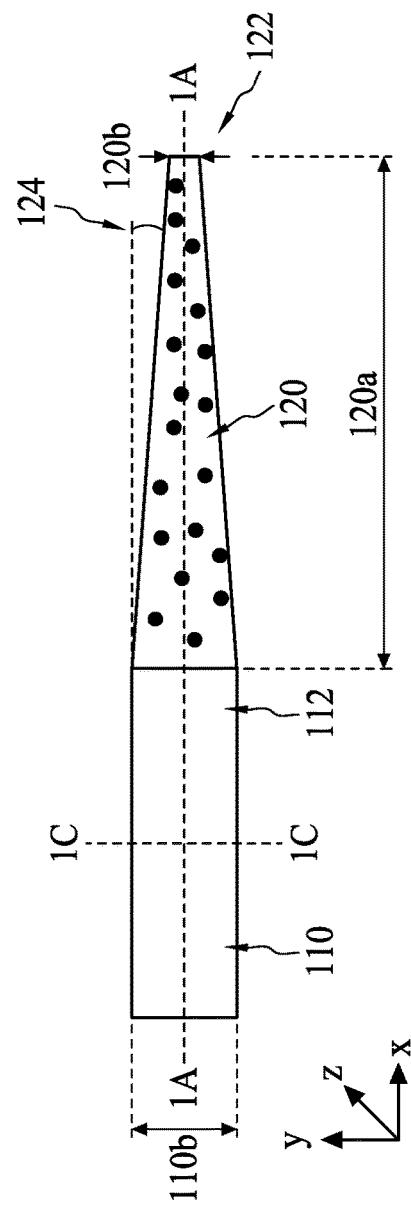
Figure 1A
Figure 1B

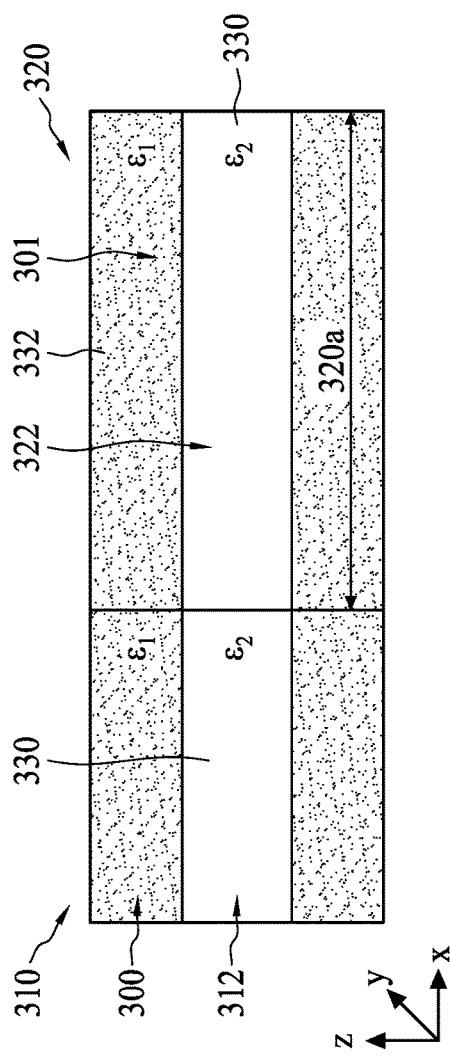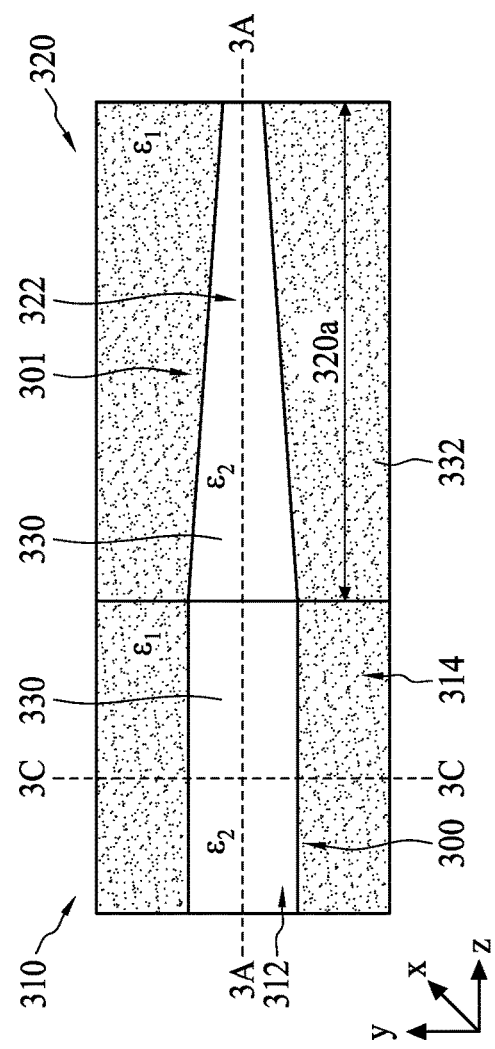

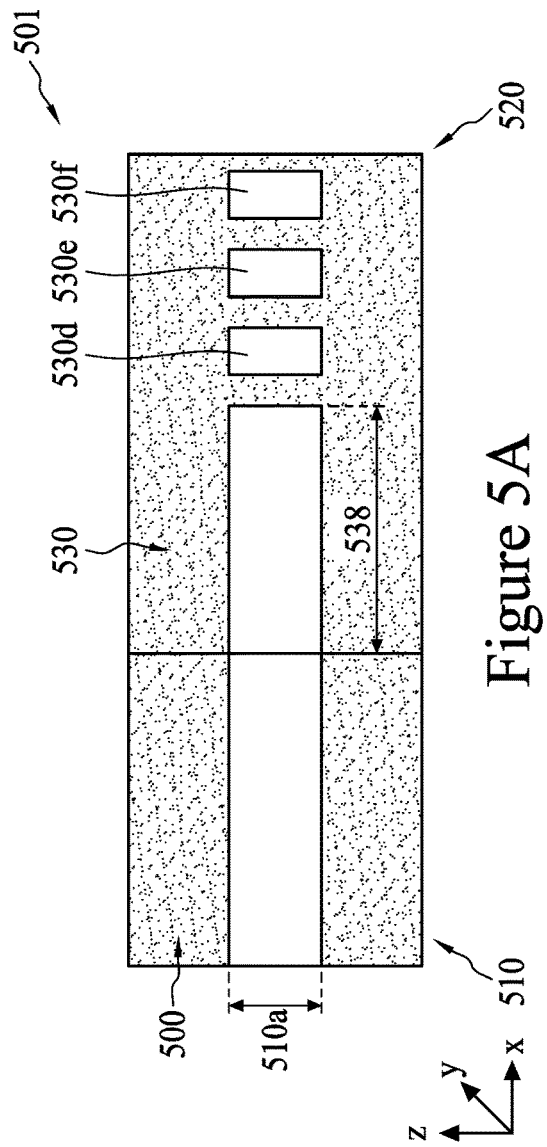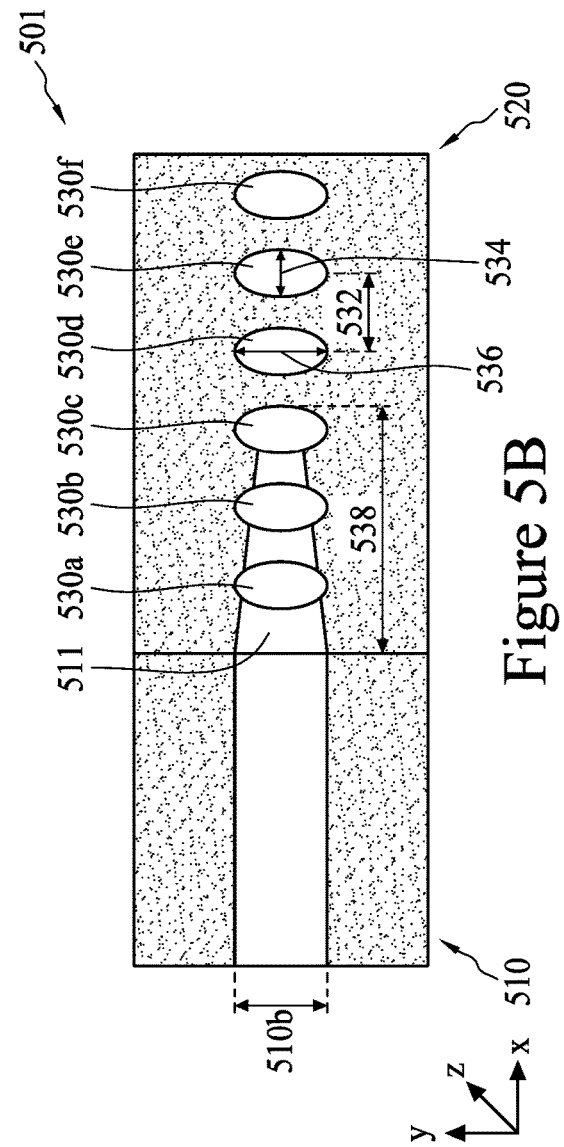

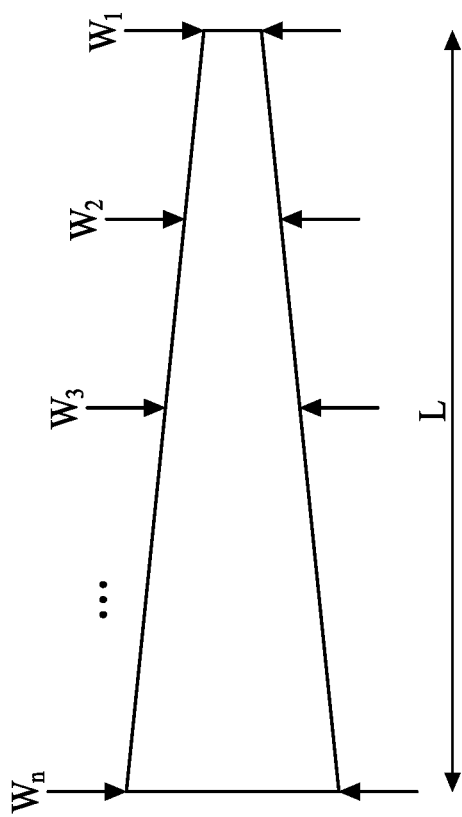
Figure 6A
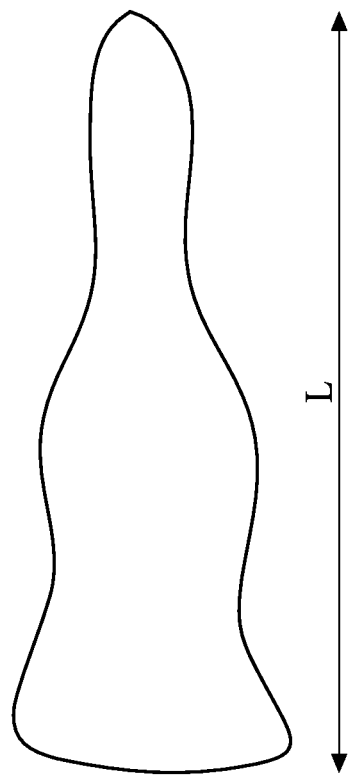
Figure 6B
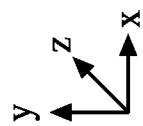

OPTICAL WAVEGUIDE TERMINATION

BACKGROUND

Optical waveguide termination is a technique or device that generally is used for attenuating unwanted optical waves at an end of an optical waveguide that is not coupled to an input or an output. The optical waveguide termination typically absorbs and scatters an incoming optical wave to minimize a reflection of the optical wave into the optical waveguide. An efficiency of termination increases with reducing the reflection of the optical wave.

BRIEF DESCRIPTION OF THE SEVERAL VIEWS OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

FIG. 1A is a cross-sectional view of a doped optical waveguide termination device coupled to an optical waveguide along 1A-1A in FIG. 1B, in accordance with some embodiments.

FIG. 1B is a top plan view of the doped optical waveguide termination device coupled to the optical waveguide of the FIG. 1A.

FIG. 3A is a cross-sectional view along 3A-3A in FIG. 3B of an optical waveguide termination device coupled to an optical waveguide, where a cladding of the termination device is low-k material, in accordance with some embodiments.

FIG. 3B is a top plan view of the optical waveguide termination device coupled to the optical waveguide of the FIG. 3A.

FIG. 5A is a cross-sectional view of a periodic optical waveguide termination device coupled to an optical waveguide, in accordance with some embodiments.

FIG. 5B is a top plan view of the periodic optical waveguide termination device coupled to the optical waveguide of the FIG. 5A.

FIG. 6A is a schematic top plan view of the tapered structure described in FIG. 1B and FIG. 6B is a top plan view of an alternative shape for the optical waveguide termination device of the FIGS. 1A-5B, in accordance with some embodiments.

DETAILED DESCRIPTION

Figure 1D:
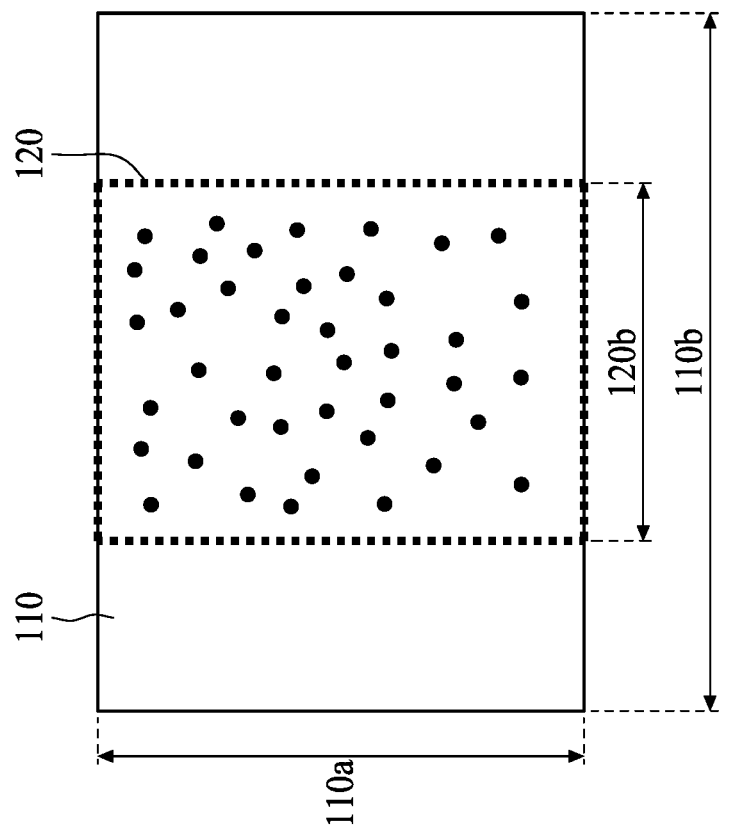
FIG. 1D is a cross-sectional view along 1C-1C in FIG. 1B of the doped optical waveguide termination device coupled to the optical waveguide of the FIG. 1A by a rectangular cross section.

An optical termination is a device generally used for terminating an unwanted electromagnetic wave, such as an optical wave, at an end of an optical waveguide through which the unwanted optical wave is propagating. This device is beneficial for optical waveguides that are not coupled to an input or an output of an optical circuit. The termination device minimizes any reflection and backscattering of the optical wave from an open end of the optical waveguide back into the optical waveguide. Thus, an efficiency of the optical termination device can be defined based on the capability of the optical termination device to absorb and attenuate incoming optical waves from the optical waveguide and/or reduce reflection or backscattering of the optical wave back into the optical waveguide. The structure of the optical termination device is an important parameter to increase an efficiency by which the termination device terminates an optical wave. For example, the structure of the optical termination device can contribute to increasing the absorption and attenuation of optical waves over a range of wavelengths. A tapered structure or profile benefits the termination efficiency, where the incoming optical wave is gradually squeezed out of the tapered structure due to a slope of a boundary of the tapered structure. For example, a shape of the tapered structure forms a tip with a first width in proximity to the end of optical waveguide and a second width farther from the end of optical waveguide, the second width being narrower than the first width.

A termination efficiency of the tapered structure or tapered profile of the optical termination depends on a length and an angle at which the tapered structure slopes from a juncture of the tapered structure with an end of an optical waveguide to an end or tip of the termination device. Increasing the length of the tapered structure increases attenuation of optical waves propagated through the waveguide, e.g. due to increased absorption, while reducing the slope of the tapered structure reduces internal reflection of the optical wave or conversely increases scattering of the optical wave. Both this increased absorption and decreased internal reflection (i.e., increased scattering) contribute positively to the termination efficiency of the optical termination. Hence, a longer and smoother tip, e.g., a tip with a smaller slope angle, of the tapered structure results in higher termination efficiency compared to a tapered structure of the same material that is shorter in length and/or includes a sharper tip, e.g., a larger slope angle. In various embodiments of the present disclosure, the termination efficiency of a tapered structure forming an optical termination device for an optical waveguide is increased by altering an optical characteristic of the tapered structure, e.g., by enhancing an absorption rate and/or scattering rate of the tapered structure with different techniques described herein. In accordance with some embodiments of the present disclosure, the length of the tapered structure can be shorter than the length of tapered structures of a termination device that do not implement embodiments of the present disclosure while providing a similar termination efficiency. In some embodiments, the slope of the tapered tip can be milder compared with a tapered structure with a lower absorption rate. In accordance with some embodiments of the present disclosure, shortening the tapered structure supports a reduction of the optical circuit size while maintaining or enhancing the termination efficiency.

FIG. 1A is a cross-sectional view of a doped optical waveguide termination device or structure 101 coupled to an optical waveguide 100, in accordance with some embodiments. FIG. 1B is a top plan view of the embodiment in FIG. 1A. In accordance with embodiments of the present disclosure, optical waveguide 100 is designed to propagate an optical wave (not shown) through the optical waveguide 100. The termination device 101 is designed to receive the optical wave from the end of the optical waveguide 100 and terminate all or a portion of the optical wave received from the end of the optical waveguide. In some embodiments, the optical characteristics of the termination device 101 are altered as described below so that the termination device 101 has a different optical characteristic than the optical waveguide and terminates the optical wave via a combination of controlled reflection and scattering of the optical wave and absorption of the optical wave in the termination device.

In some embodiments, an optical waveguide 100 includes a first portion 110 with an end 112. A second portion 120 of the structure illustrated in FIGS. 1A and 1B is a termination structure that is coupled to the first portion 110 at the end 112 of the first portion along a first axis x. This second portion 120 is also referred to as a termination structure or termination device for the optical waveguide 100 in the present disclosure and as noted above, can be formed integrally with the optical waveguide 100 or can be formed independently so as to be coupled to the optical waveguide 100. The first portion 110 has another end opposite to the end 112 that is coupled to an optical circuit (not shown). The first portion 110 has a length along the first axis x. The length and the other end of the first portion 110 are not described or illustrated in FIGS. 1A-B for simplicity. The second portion 120 has a length 120a extended from the end 112 to a termination end 122 of the second portion 120 along the first axis x. The second portion 120 has a first width 110b at a tangential point to the end 112 and a second width 120b at the end 122 along a second axis y. The first portion 110 has same width as the first width 110b along the second axis y. The second width 120b is less than the width 110b. The first portion 110 and the second portion 120 have a height 110a along a third axis z. While the length, width, and height dimensions of the first portion 110 and the second portion 120 are described above with reference to the first axis x, second axis y and third axis z respectively, the present disclosure contemplates that the length, width and the height dimensions referenced above and herein can refer to a length, width and height dimensions that are measured along different axes than those referenced above. In some examples, the length 120a is less than a length of the waveguide and the width 120b is less than the width 110b. In addition, the widths 110b and the height 110a are less than the length 120a. In some embodiments, the height 110a may be same as the width 110b. In this fashion, for a range of wavelength 1310 nm or 1550 nm, the width 110b can be designed between 100-400 nm while the width 120b can be as small as 100 nm. In addition, in some embodiments the length 120a can be 10-100 um. However, the embodiments of the present disclosure are not limited to these values. Embodiments in accordance with the present disclosure are not limited to transmitting optical waves of the foregoing wavelength. In other embodiments, optical waves of wavelengths falling outside the foregoing range can be propagated along waveguides in accordance with the present disclosure. In addition, the width 110b, width 120b, length 120a can be outside the ranges described above.

In various embodiments, the second portion 120 has its optical characteristics altered so that it has different optical characteristics than the first portion 110. For example, the optical characteristics of the second portion 120 are altered by changing the refractive index, absorption rate, scattering rate, and/or optical wave confinement of the second portion so that it is different than the refractive index, absorption rate, scattering rate, and/or optical wave confinement of the first portion 110. In one embodiment, such different optical characteristics of the second portion 120 are altered by doping the second portion with a P-type or a N-type dopant. In some examples the P-type dopant can be boron, aluminum, or indium and the N-type dopant can be phosphorus, arsenic, or antimony. A doping concentration may vary between $10^{15}$ cm$^{-3}$ to $10^{25}$ cm$^{-3}$, though embodiments of the present disclosure are not limited to doping concentrations within the foregoing range. For example, in other embodiments, the doping concentration may be above or below the range described above. In some embodiments, the second portion 120 is highly doped with a P-type or N-type dopant. For example, highly doped silicon semiconductor can refer to a doping concentration above $10^{18}$ cm$^{-3}$. In these embodiments the material of the first portion 110 and the second portion 120 includes silicon semiconductors with the silicon semiconductors of the second portion being doped as described above. In some examples, the doping process can be implantation and/or diffusion techniques. In some embodiments, the tapered structure 120 is an integral part of the optical waveguide and is formed in an etching process that also forms the first portion 110 of the waveguide. In some implementations, the tapered structure 120 is doped by an ion implantation process subsequent to a deposition process. In some examples, annealing processes are performed to activate dopants in the tapered structure 120. The second portion 120 may be doped before or after conducting the etching process that forms the optical waveguide and the tapered structure. In another example, the tapered structure may be formed separately and fused to the optical waveguide with a fusion technique. In this fashion, the tapered structure can be doped prior to the fusion of the tapered structure to the optical waveguide.

The doping described above changes or alters the optical characteristics of semiconductor materials forming the tapered structure. For example, the doping can change a bandgap of the semiconductor material that consequently results in a change in optical characteristics of the tapered structure, such as, a refractive index and an absorption rate of the tapered structure in a range of wavelengths. The doping concentration can be designed based on the desired wavelength to be absorbed. Increasing the absorption rate of the second portion 120, increases the ability of the tapered termination structure to absorb the optical wave, which translates into an increased termination efficiency. Increasing the absorption rate of the second portion 120, also reduces the intensity of the optical wave that can be reflected from the end 112. Reducing the intensity of the optical wave that can be reflected from the end 112 is desirable from the standpoint of reducing the intensity of the optical wave that is reflected back into the first portion 110 optical waveguide 100. In accordance with some embodiments of the present disclosure, by doping of the tapered termination structure as described above, the length 120a of the second portion 120 can be shorter without a reduction in the termination efficiency of the second portion 120. Shortening the second portion 120 can be desirable from the standpoint of reducing the size of second portion 120 without compromising the termination efficiency of second portion 120.

Referring to FIG. 1B, the second portion 120 has a tapered shape when viewed from the top or along the z axis. The tapered shape of the second portion 120 promotes an attenuation of the incoming optical wave by increasing scattering (e.g., by reducing the amount of internal reflection of the optical wave) of the optical energy out of the second portion 120 along the first axis x and the second axis y. In this condition, the optical wave is gradually scattered out from the second portion 120 of the waveguide because a width along the second axis y is reduced gradually that reduces a confinement factor. Generally, an optical wave is confined in an optical waveguide based on an incident angle of the optical wave at a boundary of a core of the waveguide and a material to the exterior of the core of the waveguide. The confinement factor depends on two main features of the optical waveguide that are a width of the core and a refractive index difference between the core and the material to the exterior of the core. Reduction of the width of the core reduces the confinement factor, and as a result, increases the optical wave spreading out (e.g., scattering) from the core. In a similar fashion, reduction of the difference between the refractive index of the core and the material to the exterior of the core reduces the confinement factor of the optical waveguide. Hence the tapered structure can reduce the confinement factor at the end of the optical waveguide due to a reduction of the width of the second portion 120 in second axis y.

In the embodiment illustrated in FIG. 1B, a tip 122 of the tapered second portion 120 has the width 120b measured along the second axis y. A difference between the widths 110b and 120b of the tapered second portion 120 results in a slope of the tapered second portion 120 with an angle 124. The angle 124 in combination with the length 120a introduce a sharpness of the tip. Assuming a constant angle 124, a longer length 120a results in a sharper tip (e.g., less slope) with a narrower width 120b. Conversely, assuming a constant angle 124, a shorter length 120a results in a blunter tip with a greater width 120b. A minimum value of width 120b may be limited by manufacturing technologies and the optical circuit robustness. Accordingly, in some embodiments, a shorter length 120a with the constant angle 124 and a larger width 120b is desirable for both manufacturing process, optical circuit robustness and packaging point of views. The embodiment of FIGS. 1A-B provides a doped optical waveguide termination structure of reduced length that provides the same or an increased termination efficiency compared to an undoped optical waveguide termination structure having the same the taper angle 124 and longer length 120a. In addition, the width 120b affects an internal reflection from the end 122. Assuming a constant length 120a, a sharper tip causes a greater slope compared with a thicker tip. A greater slope may increase the internal reflection due to an abruptly changing of the width of the waveguide's core, and consequently reduces the termination efficiency. In this embodiment shortening the length 120a with a constant angle 124 result in a thicker tip end 122 with lower internal reflection compared to a tip end that is sharper, i.e., longer with the same constant angle 124. In addition, the doping of the semiconductor material of the tapered structure increases the absorption rate which allows for a reduced length of the tapered structure, thereby making the smaller termination device compatible with the ever increasing demand for increased feature density of semiconductor devices. In addition, the robustness of the termination device as well as the efficiency of the termination device are enhanced.

Therefore, in accordance with some embodiments of the present disclosure illustrated in FIGS. 1A and 1B, by doping the second portion 120 to alter the optical characteristics of the second portion, the length 120a of the second portion 120 can be shortened while maintaining the tapered shape of the second portion without a reduction, and in some embodiments with an increase, in the termination efficiency of the second portion 120. In other embodiments, by doping the second portion 120 to alter its optical characteristics, the length of the second portion 120 can be shortened while reducing or increasing the slope of the tapered second portion 120 without a reduction, and in some embodiments with an increase, in the termination efficiency of the second portion 120.

Figure 1C:
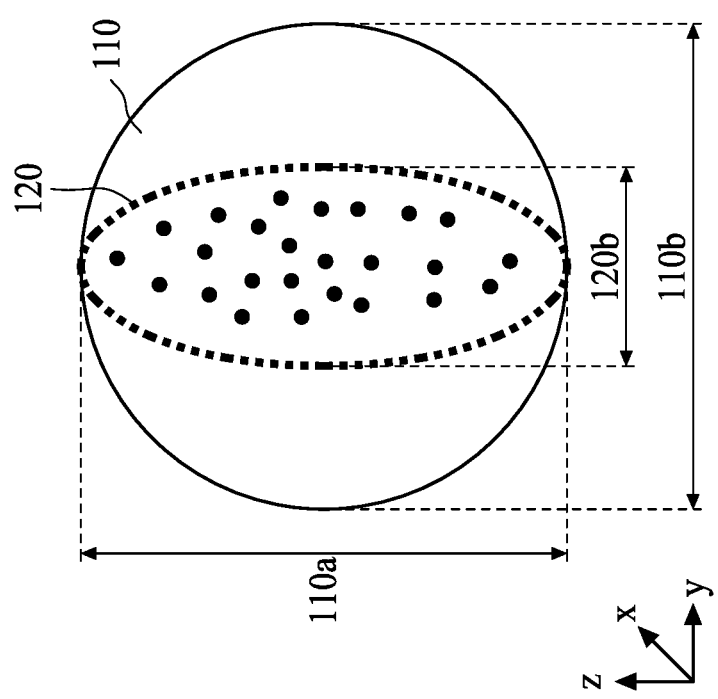
FIG. 1C is a cross-sectional view along 1C-1C in FIG. 1B of the doped optical waveguide termination device coupled to the optical waveguide of the FIG. 1A by a circular cross section.

FIG. 1C is a cross-sectional view along line 1C-1C in FIG. 1B of the first portion 110 and the second portion 120 described above for the optical waveguide 100 and termination device 101 of embodiments in FIGS. 1A-B. In an embodiment, the optical waveguide 100 and termination device 101 may be a fiber optic waveguide with a circular cross section. In the embodiment illustrated in FIG. 1C, the dashed line depicts a boundary of the doped region of the second portion 120 at the end 122 of the termination device 101 of embodiments in FIGS. 1A-B. In a circular fiber optic waveguide, the dimensions 110a and 110b of embodiments in FIGS. 1A-B are same and equal to a diameter of the circular cross section of the first portion 110. In some examples, such as the one illustrated in FIG. 1C, the second portion 120 may have an elliptical cross section. A major diameter of the elliptical cross section of the second portion 120 may be same as the dimension 110a, while a minor diameter of the elliptical cross section of the second portion 120 is same as dimension 120b described in FIG. 1B.

FIG. 1D is a cross-sectional view along line 1C-1C in FIG. 1B of the first portion 110 and the second portion 120 described above for the optical waveguide 100 and termination device 101 of embodiments in FIGS. 1A-B. In the illustrated embodiment, the optical waveguide 100 and termination device 101 may be a planar waveguide with a rectangular cross section. The dashed line depicts a boundary of the doped region of the second portion 120 at the end 122 of the termination device 101 of embodiments in FIGS.

1A-B. In the planar waveguide, the dimensions 110a may be less than the dimension 110b of embodiments in FIGS. 1A-B. In some examples, the second portion 120 may have a rectangular cross section. In this fashion, a dimension of the rectangular cross section in the third axis z may be same as the dimension 110a, while a dimension of the rectangular cross section of the second portion 120 is same as the dimension 120b described in FIG. 1B. Alternatively, the cross section of the second portion 120 may be elliptical, e.g., the same as the embodiment of FIG. 1C.

Figure 2A:
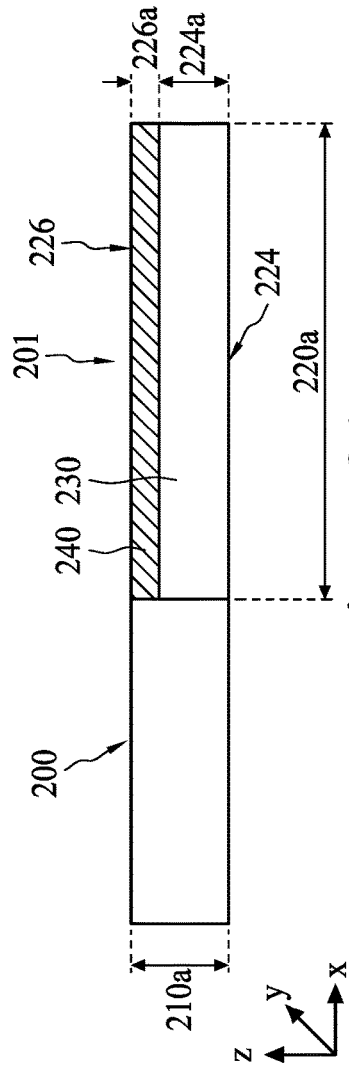
FIG. 2A is a cross-sectional view along 2A-2A in FIG. 2B of a multi-layer optical waveguide termination device coupled to an optical waveguide, in accordance with some embodiments.
Figure 2B:
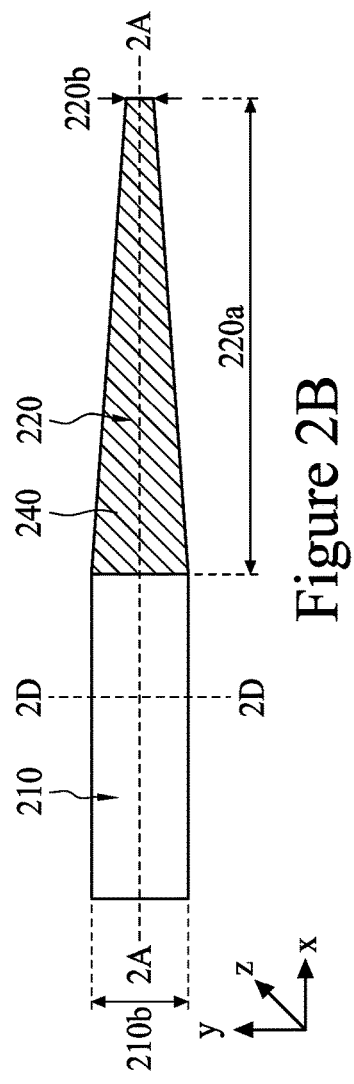
FIG. 2B is a top plan view of the multi-layer optical waveguide termination device coupled to the optical waveguide of the FIG. 2A.

FIG. 2A is a cross-sectional view of a multi-layer optical waveguide termination device 201 formed integrally with or coupled to an optical waveguide 200, in accordance with some embodiments. FIG. 2B is a top plan view of the embodiment in FIG. 2A. The optical waveguide 200 and the termination device 201 having the same dimensional and connection characteristics as described above for the optical waveguide 100 and termination device 101 of embodiments in FIGS. 1A-B. The embodiment of a termination device 201 in FIGS. 2A and 2B includes two layers of different materials stacked in the second axis y. The layered structure alters the optical characteristics of the termination device 201 by enhancing the absorption rate of the tapered tip by changing an effective refractive index (and permittivity or dielectric constant) of the termination device as well as increasing absorption of the optical wave in a range of wavelengths.

In some embodiments, the dimensions and structure of the first portion 210 (optical waveguide 200) and second portion 220 (termination structure 201) are same as the dimension and structures of the first and second portions 110, 120 of the embodiments described in FIGS. 1A-B. The second portion 220 includes a first layer 224 with a first material 230 and a second layer 226 with a second material 240. In the illustrated embodiment, the first portion 210 is formed of the first material 230. The first layer 224 has a first height 224a along the third axis z. The second layer 226 has a second height 226a along the third axis z. In some embodiments, the first height 224a is greater than the second height 226a. In some embodiments the ratio of the first height 224a to the second height 226a is in the range between 3 and 4. For instance, the first height 224a can be about 200-400 nm while the second height 226a being about 100 nm. However, the dimensions of the present disclosure are not limited to these values, and in some embodiments, the first height 224a and the second height 226a can fall outside of the values described above and the ratio of the first height 224a to the second height 226a can fall outside the range of ratios described above. The first portion 210 and the second portion 220 have a height 210a along the third axis z. The second portion 220 has a length 220a along the axis x and a tip width 220b along the y axis that can be same as the length 120a and the tip width 120b of FIGS. 1A-B. The height 210a can be a summation of the first height 224a and the second height 226a. In some examples, the height 210a is less than the summation of the first height 224a and the second height 226a. The first portion has a width 210b along the axis y that can be same as the width 110b of FIGS. 1A-B. While the length, width, and height dimensions of the first portion 210 and the second portion 220 are described above with reference to the axis x, axis y and axis z respectively, the present disclosure contemplates that the length, width and the height dimensions referenced above and herein can refer to dimensions determined along different axes than those referenced above.

In various embodiments, the first material 230 is different than the second material 240. The first material 230 may have an electrical bandgap greater than the electrical bandgap of the second material 240. In such fashion, an optical characteristic of the second material 240 is different than the same optical characteristic for the first material 230, e.g., optical energy absorption rate of the second material 240 is greater than the optical energy absorption rate of the first material 230 in a range of wavelengths. This difference in optical characteristic of the second material 240 and the optical characteristic of the first material 230 results in an altering of the optical characteristic of the second portion 220. The second material 240 can be chosen based on a desired bandgap that provides an optimal absorption in a specific range of wavelengths being propagated along the waveguide 200. In some examples, the second material 240 is selected from metallic silicide and germanium when the first material 230 is a semiconductor material described above. Embodiments in accordance with the present disclosure are not limited to the second material being a metallic silicide or germanium. Other materials that provide desired absorption of the specific wavelengths of the optical waves transmitted along waveguide 200 are also suitable for use as the second material 240. For instance, the second material 240 may include one or more metal layers of aluminum (Al), copper (Cu), tungsten (W), titanium (Ti), tantalum (Ta), cobalt (Co), molybdenum (Mo), ruthenium (Ru), nickel (Ni), or other metals, and may be formed by CVD, PVD, ALD, plating, or other suitable processes. Examples of wavelengths propagated along waveguide 200 fall in the range of 1310 nm to 1550 nm. Embodiments in accordance with the present disclosure are not limited to transmitting optical waves of the foregoing wavelength. In other embodiments, optical waves of wavelengths falling outside the foregoing range can be propagated along waveguides in accordance with the present disclosure.

The height 226a can be thin enough to form a thin film on material 240 on the first layer 224. Example heights range about 100 nm. The thin film structure 226 of material 240 on the first layer 224 absorbs more optical energy than the material 230, and consequently reduces the reflection of the optical wave back into the first portion 210. In addition, a thin film structure 226 of material 240 on the first layer 224 can reduce a confinement factor of the second portion 220 due to reducing a refractive index difference between the material 230 of first layer 224 and the material 240 of thin film structure 226, and results in spreading out portions of the optical energy that is not absorbed by the materials of second portion 220. In some embodiments, the height 226a is greater than 25% of the height 210a.

Therefore, in accordance with some embodiments of the present disclosure illustrated in FIGS. 2A and 2B, by providing the multi-layer structure of the second portion 220, the length of the second portion 220 can be shortened while maintaining the tapered shape of the second portion without a reduction, and in some embodiments with an increase, in the termination efficiency of the second portion 220. In other embodiments, by providing the multi-layer structure of the second portion 220, the length of the second portion 220 can be shortened while reducing or increasing the slope of the tapered second portion 220 without a reduction, and in some embodiments with an increase, in the termination efficiency of the second portion 220.

In some embodiments, the first material 230 of the second portion 220 is a semiconductor material, such as the semiconductor materials described above, that is doped with N-type or P-type materials as described in the embodiment of FIGS. 1A-B. In this fashion, the absorption rate of the second portion 220 is enhanced by both doping the first material 230 and providing the layered structure 226 of the second material 240. In accordance with these embodiments, the length 220a can be shorter than the length 120a in FIGS. 1A-B.

In some embodiments, the second layer 226 can be formed by a combination of photolithography, etching, and deposition processes after first portion 210 and a precursor to layer 224 have been formed by a combination of photolithography, etching and deposition processes. For example, a portion of a terminal end of a formed first portion 210 can be etched with an etching technique to form layer 224 prior to the deposition of the second layer 226 of material 240 onto layer 224.

Figure 2C:
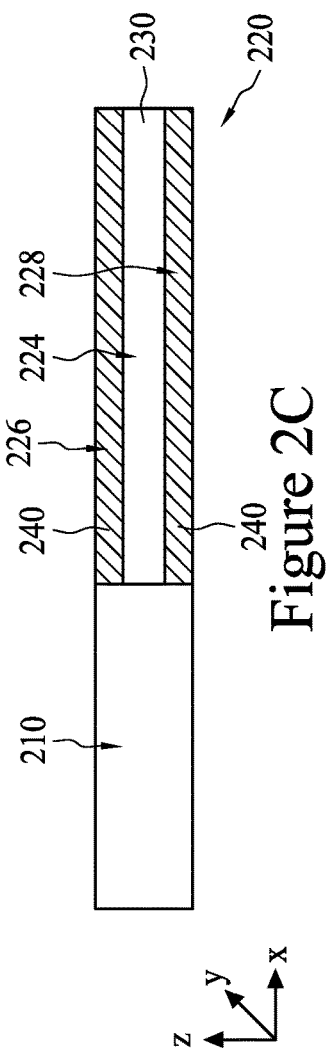
FIG. 2C is a cross-sectional view of an alternative embodiment of a multi-layer optical waveguide termination device of FIG. 2A with an additional layer.

FIG. 2C shows an embodiment of the termination device of FIG. 2A with an additional layer. In this embodiment, a third layer 228 of the second material 240 can be formed on a side of first layer 224 that is opposite to the side of first layer 224 where second layer 226 is located. In such embodiment, third layer 228 can be formed by a deposition process prior to formation of the first layer 224 on third layer 228. In some embodiments, first layer 224 and third layer 228 can be patterned and etched simultaneously or independently to provide the tapered shape of second portion 220. As described above, the absorption rate of the material 240 is greater than the material 230. Hence, adding the third layer 228 with the material 240 can increase an effective absorption rate of the second portion 220, which can produce higher termination efficiency than a single layer deposition. The higher efficiency provides an opportunity to even further reduce the length 220a and minimize the termination device size. In some embodiments, a material of the third layer 228 can be different than the material of the second layer 226. In this fashion, each layer can absorb a range of wavelengths different than each other. Such configuration could provide benefits of a multi-wavelength termination with a single device. A height of the third layer 228 can be different than or the same as the second layer 226 and the third layer 228 can be a thin film.

Figure 2E:
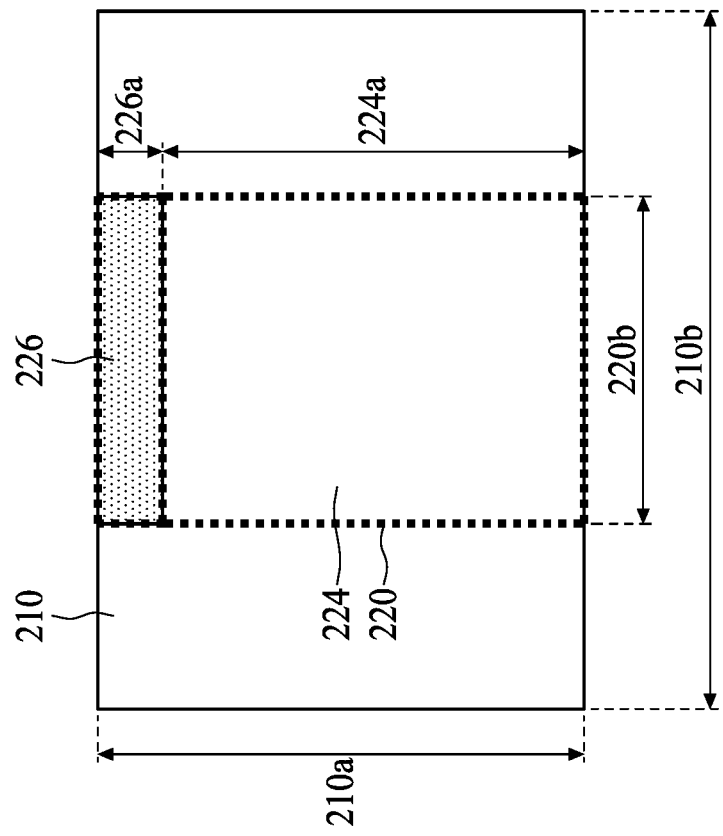
FIG. 2E is a cross-sectional view along line 2D-2D in FIG. 2B of the multi-layer optical waveguide termination device of FIG. 2A by a rectangular cross section.
Figure 2D:
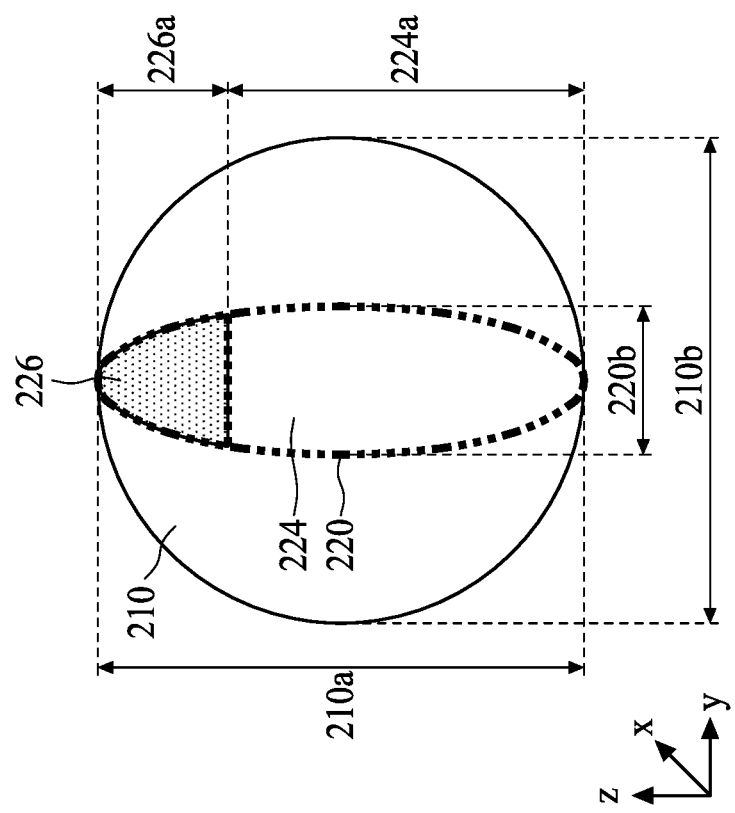
FIG. 2D is a cross-sectional view along line 2D-2D in FIG. 2B of the multi-layer optical waveguide termination device of FIG. 2A by a circular cross section.

FIG. 2D is a cross-sectional view along line 2D-2D in FIG. 2B of the first portion 210 and the second portion 220 described above for the optical waveguide 200 and termination device 201 of embodiments in FIGS. 2A-B. In an embodiment, the optical waveguide 200 and termination device 201 may be a fiber optic with a circular cross section. In the embodiment illustrated in FIG. 2D, the dashed line depicts a boundary of the tip portion of the second portion 220 of the termination device 201 described in FIGS. 2A-B. In some examples, the second portion 220 may have an elliptical cross section. The circular and elliptical cross sections may be the same as the circular and elliptical cross section of the fiber optic described in FIG. 1C. The dimensions 210a and 210b of embodiments in FIGS. 2A-B are same and equal to a diameter of the circular cross section of the first portion 210. A major diameter of the elliptical cross section of the second portion 220 may be same as the dimension 210a, while a minor diameter of the elliptical cross section of the second portion 220 is same as dimension 220b described in FIG. 2B. The first layer 224 is a portion of the ellipse with the height 224a and the second layer 226 is a remaining portion of the ellipse with the height 226a in the third axis z. In other embodiments, the second portion 220 may have a circular cross-section.

FIG. 2E is a cross-sectional view along line 2D-2D in FIG. 2B of the first portion 210 and the second portion 220 described above for the optical waveguide 200 and termination device 201 of embodiments in FIGS. 2A-B. In the illustrated embodiment, the optical waveguide 200 and termination device 201 may be a planar waveguide with a rectangular cross section the same as the embodiment of FIG. 1D. The dashed line depicts a boundary of the tip portion of the second portion 220 of the termination device 201 in FIGS. 2A-B. In the planar waveguide, the dimensions 210a may be less than the dimension 210b of embodiments in FIGS. 2A-B. In some examples, the second portion 220 may have a rectangular cross section. In this fashion, a dimension of the rectangular cross section in the third axis z may be same as the dimension 210a, while a dimension of the rectangular cross section of the second portion 220 is same as the dimension 220b described in FIG. 2B. Alternatively, the cross section of the second portion 220 may be elliptical the same as the embodiment of FIG. 2D. The first layer 224 is a portion of the rectangle with the height 224a and the second layer 226 is a remaining portion of the rectangle with the height 226a in the third axis Z.

FIG. 3A is a cross-sectional view along line 3A-3A in FIG. 3B, of an optical waveguide termination device 301 coupled to or integrally formed with an optical waveguide 300, where the termination device 301 has had its optical characteristics altered by providing a cladding as described below. In some embodiments, the cladding is of a low-k material. FIG. 3B is a top plan view of the embodiment in FIG. 3A. The optical waveguide 300 and the termination device 301 have the same or similar dimensional and connection characteristics as described the optical waveguide 100 and the termination device 101 described above for the embodiment in FIGS. 1A-B. The low-k cladding of the termination device exhibits a refractive index that contributes to the reduction in an optical wave confinement by the termination device 301 which enhances scattering of the optical wave from the termination device, i.e., alters the optical characteristics of the termination device 301. This enhanced scattering of the optical wave from the termination device enhances the termination efficiency of the termination device.

In general, an optical waveguide 300 includes core 312 of a material 330 and cladding 314 of a material 332. A refractive index of the material 330 of the core 312 is greater than the refractive index of the material 332 of cladding 314. An optical wave propagating along the optical waveguide 300 is confined inside the core 312 due to the refractive index difference between the material 330 of the core 312 and the refractive index of the material 332 of the cladding 314. This confinement is stronger for a greater difference between these respective refractive indexes. In a similar fashion, the confinement of the optical wave can be decreased by reducing the difference between the refractive indexes of the material 330 of core 312 and the material 332 of the cladding 314. The refractive index of a material relates to a square root of an electrical permittivity of a material. Thus, an electrical permittivity of the material 330 of core 312 of the optical waveguide 300 is greater than an electrical permittivity of a material 332 of cladding 314 of the optical waveguide 300 and termination device 301.

In the embodiment illustrated in FIGS. 3A and 3B, a first portion 310 includes a first core 312 and a cladding 314 and a second portion 320 includes a second core 322 and a cladding 314. The cores 312 and 322 have the same dimension and structure as described for the first and second portions 110, 120 in FIGS. 1A-B. The first portion 310 and the second portion 320 include a cladding 314 of a material 332. In some embodiments, the material 332 has a first electrical permittivity 81. The first electrical permittivity $\varepsilon_1$ is less than an electrical permittivity $\varepsilon_2$ of the first core 322 of the first portion 310 and the second core 312 of the second portion 320. In some embodiments, the material 332 is a low-k material. The low-k material has an electrical permittivity less than an electrical permittivity of silicon-dioxide ($SiO_2$) and greater than air. Assuming that silicon-dioxide being the core and air being the cladding of the optical waveguides described above for FIGS. 1A-2E, using a low-k material instead of air as a cladding for an optical waveguide with a same silicon-dioxide based core results in less difference between the refractive index of the material of cores 312, 322 and the refractive index of the material 332 of cladding 314, i.e., alters the optical characteristics of the second portion 320. Consequently, a confinement of the optical wave inside the cores 312, 322 is decreased when a low-k cladding 314 is provided compared with air serving as the cladding. The less confinement results in more scattering out the optical wave from the second core 322 of the second portion 320. However, the confinement of the optical wave inside the first core 312 of the first portion 310 is still sufficient for guiding an optical mode in a range of wavelengths corresponding to a dimension of the first core 312. The confinement is gradually decreased along a tapered structure of the second portion 320 by reducing the core dimension in axis y, where the low-k cladding material 332 increases scattering of the optical wave from the second core 322. By decreasing the optical wave confinement using material 332 as cladding 314 in accordance with this embodiment, the termination efficiency of the termination structure is enhanced without changing the material and characteristics of the second core 322. In various embodiments, low-k materials may include FSG, carbon doped silicon oxide, Black Diamond® (Applied Materials of Santa Clara, CA), xerogel, aerogel, amorphous fluorinated carbon, Parylene, BCB, SILK® (Dow Chemical, Midland, MI), polyimide, other low-k dielectric material, or combinations thereof.

In some examples, the cladding 314 may be formed by depositing a dielectric material using processes such as a chemical vapor deposition (CVD) process, a sub-atmospheric CVD (SACVD) process, a flowable CVD process, an atomic layer deposition (ALD) process, a physical vapor deposition (PVD) process, or other suitable processes.

In various embodiments, an electrical permittivity $\varepsilon_2$ of the first material 330 is greater than an electrical permittivity $\varepsilon_1$ of the second material 332. In some examples, the first material 330 can be silicon-dioxide and the second material 332 can be a low-k material. In this fashion, $\varepsilon_1$ is greater than the air permittivity and less than the $\varepsilon_2$. Thus, a difference between $\varepsilon_1$ and $\varepsilon_2$ is less than a difference between air and $\varepsilon_2$ of the conventional waveguides. Consequently, a confinement of the optical wave is decreased with using the low-k material with $\varepsilon_1$ permittivity. In some examples, the doping embodiment of the FIGS. 1A-B and the multi-layer embodiment FIGS. 2A-C can be combined with the embodiment of FIGS. 3A-B to increase the absorption rate of the optical waveguide termination device.

A relative permittivity (also called dielectric constant) is a ratio of the electrical permittivity of a material (e.g., $\varepsilon_1$ and $\varepsilon2$) to the permittivity of a vacuum (or air). In some examples, the relative permittivity of the material of the cladding 314 may be between the relative permittivity of air (~1) to the relative permittivity of silicon-dioxide (~3.9). In some examples, a material of the cladding 314 of the second portion 320 can be different than material of the cladding of the first portion 310. In such a fashion, a difference between the permittivity of the material of the cladding 314 of the first portion 310 and the material of the cladding 314 of the second portion 320 may result in a reflection of the optical wave from the second portion 320 into the first portion 310.

In some embodiments, to decrease such reflection, a permittivity of the material of the cladding 314 of the second portion 320 can gradually increase along the first axis x.

Figure 3D:
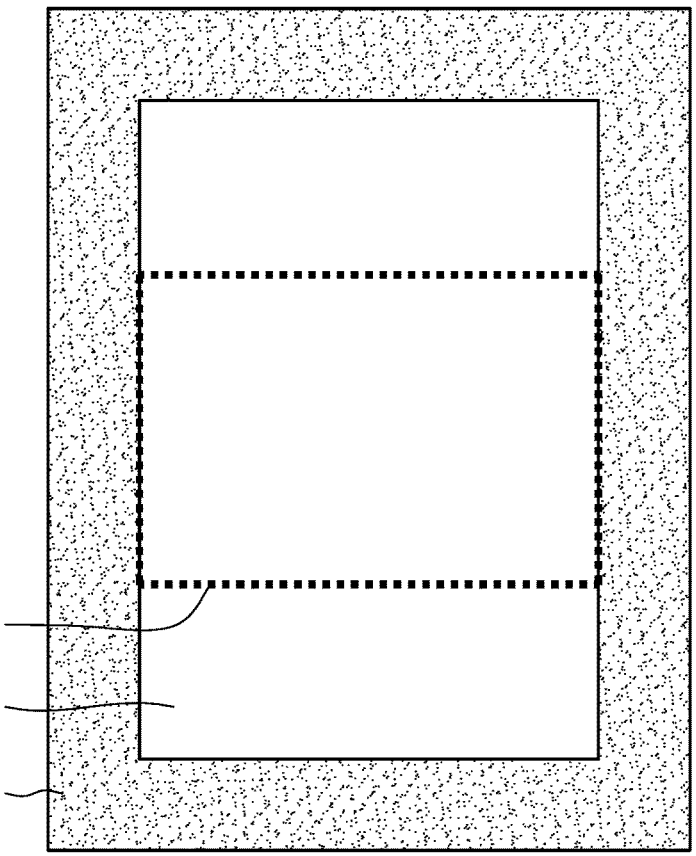
FIG. 3D is a cross-sectional view along line 3C-3C in FIG. 3B of the optical waveguide termination device coupled to the optical waveguide of the FIG. 3A by a rectangular cross section.
Figure 3C:
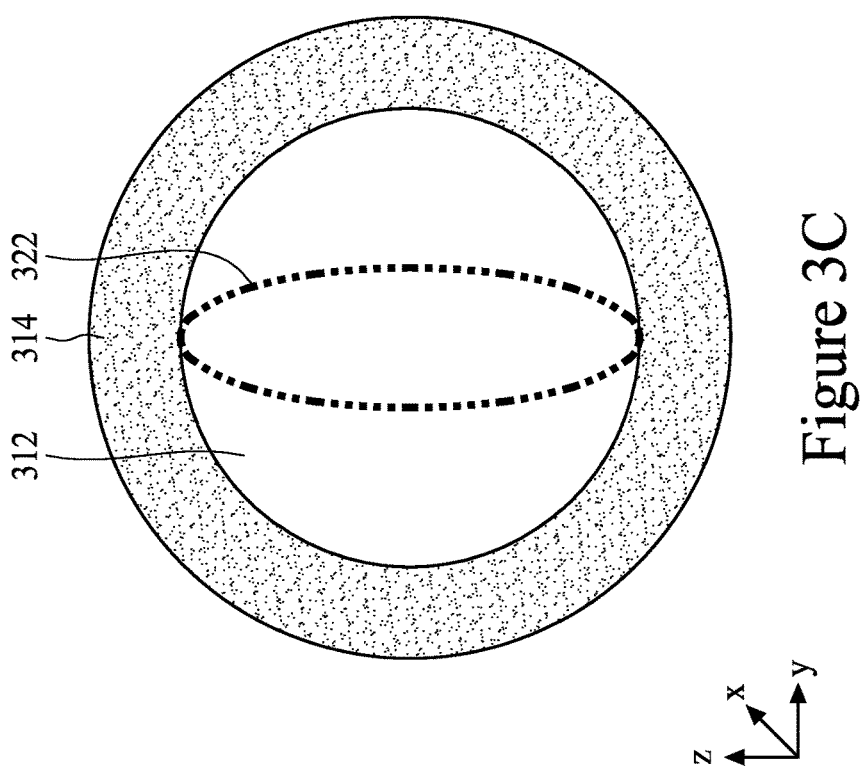
FIG. 3C is a cross-sectional view along line 3C-3C in FIG. 3B of the optical waveguide termination device coupled to the optical waveguide of the FIG. 3A by a circular cross section.

FIG. 3C is a cross-sectional along line 3C-3C in FIG. 3B of the core 312 and the core 322 described above for the optical waveguide 300 and termination device 301 of embodiments in FIGS. 3A-B. In an embodiment, the optical waveguide 300 and termination device 301 may be a fiber optic with a circular cross section. In the embodiment illustrated in FIG. 3C, the dashed line depicts a boundary of the tip portion of the core 322 of the termination device 301 described in FIGS. 3A-B. In some examples, the second portion 320 may have an elliptical cross section. The shape and dimensions of the circular and elliptical cross sections may be the same as the circular and elliptical cross sections of the fiber optic described in FIG. 1C. In this fashion, the cladding 314 may be conformally formed around the cores 312 and 322. The cladding 314 may have a circular shape with the same diameter for both the cores 312 and 322. Alternatively, the cladding 314 may be circular over the core 312, while is elliptical over the elliptical portion of the core 322.

FIG. 3D is a cross-sectional view along line 3C-3C in FIG. 3B of the core 312 and the core 322 described above for the optical waveguide 300 and termination device 301 of embodiments in FIGS. 3A-B. In the illustrated embodiment, the optical waveguide 300 and termination device 301 may be a planar waveguide with a rectangular cross section the same as the embodiment of FIG. 1D. The dashed line depicts a boundary of the tip portion of the core 322 of the termination device 301 in FIGS. 3A-B. In some examples, the core 322 may have a rectangular cross section. The shape and dimensions of the rectangular cross sections may be the same as the rectangular cross sections of the planar waveguide described in FIG. 1D. In this fashion, the cladding 314 may be conformally formed around the cores 312 and 322. The cladding 314 may have a rectangular shape with the same dimension for both the cores 312 and 322. Alternatively, the cladding 314 may have a greater dimension over the core 312 rather than the cladding portion over the core 322 in the second axis y.

Figure 4A:
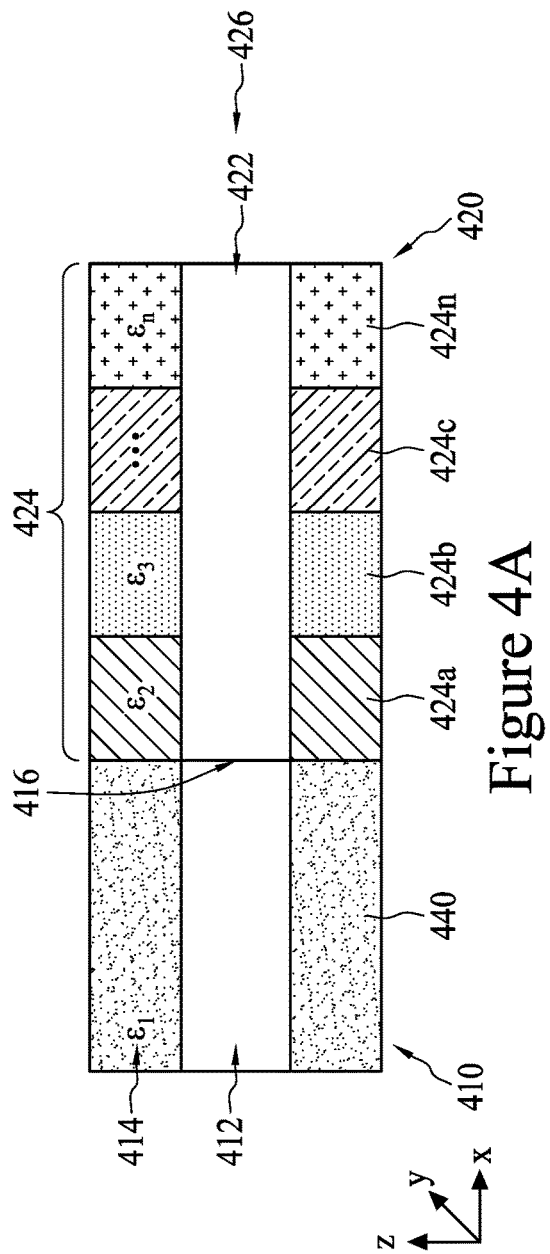
FIG. 4A is a cross-sectional view along line 4A-4A in FIG. 4B of an optical waveguide termination device coupled to an optical waveguide, where a cladding of the termination device includes a plurality of different dielectric layers, in accordance with some embodiments.
Figure 4B:
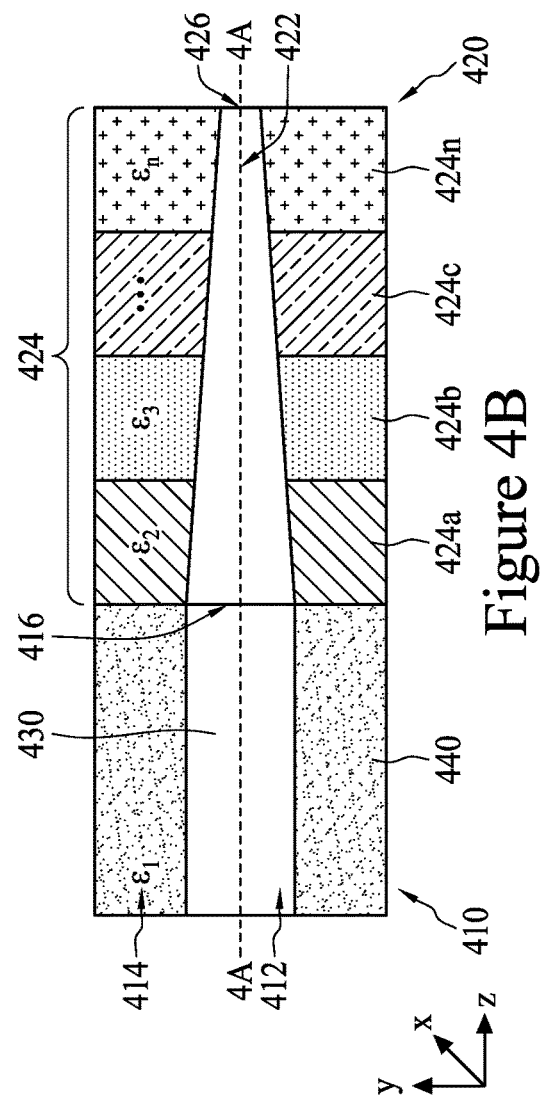
FIG. 4B is a top plan view of the optical waveguide termination device coupled to the optical waveguide of the FIG. 4A.

FIGS. 4A-B are a cross-section and top plan view of the structure of the embodiment of FIGS. 3A-B, where the permittivity of the material of cladding 314 of the second portion 320 is not uniform along the first axis x. In this fashion, the electrical permittivity of the second cladding is increased gradually along the first axis x as a way of altering the optical characteristics of the second portion 320 in accordance with embodiments of the present disclosure. A cross-sectional view from z-y plane here may be the same as the embodiments of FIGS. 3C-D.

In some embodiments illustrated in FIGS. 4A and 4B, a first portion 410 includes a first core 412 and a first cladding 414. A second portion 420 includes a second core 422 and a second cladding 424. In some embodiments, the first core 412 and the second core 422 are formed from a first material 430. In other embodiments, the first core 412 and the second core 422 are formed from different materials. This also applies to the cores of first portions and second portions of the embodiments of FIGS. 1A-3D. The first cladding 414 includes a second material 440. In some examples, the second material 440 can be the low-k material described above for the embodiment in FIGS. 3A-B. The second cladding 424 includes multiple layers or sections 424a-424d of materials having different electrical permittivity properties arranged along the first axis x. In one embodiment, an electrical permittivity of the individual layers or sections 424a-424n of materials of second cladding 424 is decreased from a boundary 416 of the second cladding 424 to an end of the second cladding adjacent an end 426 of the second portion 420. In other words, $\varepsilon_2 > \varepsilon_3 > \varepsilon_n$ in FIG. 4B. In some embodiments one or more of the adjacent layers or sections 424b-424n can have equal electrical permittivity. In this fashion, changing the permittivity of cladding in each portion of the second portion 420 changes an effective permittivity of the corresponding portion. As a result, by reducing permittivity of each cladding, the effective permittivity of the corresponding portion is decreased. Consequently, an effective permittivity at the end of the tapered structure is closer to the permittivity of the air compared with the portions closer to the first portion 410. Hence, the optical wave leakage at the tapered structure may propagate toward the outside environment easier than the embodiment of FIG. 3A-B. In accordance with some embodiments, the electrical permittivity of the layer or section 424a of the second cladding 424 adjacent to the first cladding 414 is close to or equal to electrical permittivity of the low-k material of the first cladding 414. In this circumstance, a reflection of the optical wave from the boundary 416 is reduced or avoided due to only a small change in the permittivity between the second material 440 of the cladding 414 and the material of second cladding 424a. In some examples, an absorption rate of the core 422 of the second portion 420 can be increased by the techniques described above for the doping or multi-layer embodiments of FIGS. 1A-2E. In such a fashion, the core 422 of the second portion 420 can be doped with N-type or P-type materials. In addition, the core 422 of the second portion 420 can be a multi-layer structure along the third axis z, comprising different material with different electrical bandgap such as those described above with reference to FIGS. 2A and 2B.

In some examples, the claddings 414 and 424 may be formed by depositing different dielectric materials using processes such as a chemical vapor deposition (CVD) process, a sub-atmospheric CVD (SACVD) process, a flowable CVD process, an atomic layer deposition (ALD) process, a physical vapor deposition (PVD) process, or other suitable processes. The multiple layers or sections 424a-424d may be formed in multiple deposition steps, where in each step a layer of the sections 424a-424d is formed with the corresponding permittivity of the layer.

FIG. 5A is a cross-sectional view of a periodic optical waveguide termination device 501 including a tapered structure which has had its optical characteristics altered by providing an overlapping periodic structure and been coupled to or is integral with an optical waveguide 500 of first portion 510, in accordance with some embodiments. FIG. 5B is a top plan view of the embodiment in FIG. 5A. The optical waveguide 500 of first portion 510 has the same characteristics as the optical waveguide 100 of the first portion 110 described above for the embodiment in FIGS. 1A-B. A cross-sectional view from z-y plane here may be the same as the embodiments of FIGS. 1C-D. The termination device 501 of the second portion 520 comprises a periodic structure overlapping with a tapered structure along the first axis x. The tapered structure in FIG. 5A has the same characteristics as the tapered structure of the second portion 120 described above for the embodiment in FIGS. 1A-B. In accordance with embodiments of the present disclosure, the periodic structure enhances the rate at which the tapered structure absorbs or terminates the optical wave and the optical termination device of FIGS. 5A and 5B is a structure that reduces the reflection of the optical wave from the second portion 520 to the first portion 510. Therefore, the termination efficiency is enhanced due to the reflection reduction as well as the absorption enhancement.

In some embodiments, the optical waveguide 500 includes a first portion 510. The termination device or structure is represented by a second portion 520. The first portion 510 has the same characteristics as the first portion 110 of FIGS. 1A-B. The second portion 520 includes a tapered structure 511 with the same characteristics as the tapered structure of second portion 120 of FIGS. 1A-B. The second portion 520 further includes a periodic structure 530. The periodic structure 530 includes a plurality of columnar structures 530a-530f arranged along the first axis with a period 532. Only six columns are shown in FIGS. 5A and 5B for simplicity; however, the number of columns may be more than 5, for example in some embodiments the number of columnar structures 530 can be 100 or more. The first portion 510 and the second portion 520 with the plurality of columnar structures 530a-530f have a height 510a along the third axis z. The first portion 510 and the second portion 520 with the plurality of columnar structures are formed of a first material 540. In this embodiment, each column of the plurality of columnar structures 530a-530f has an elliptic cross section in a plane between the first axis x and the second axis y. Each ellipse has a first dimension 534 along the first axis x and a second dimension 536 along the second axis y.

In some embodiments, the dimension 536 is greater than the dimension 534. The dimension 536 can be same as a width 510b of the first portion 510. The dimension 534 is a duty cycle of the periodic structure of columnar structures 530a-530f. The duty cycle determines a confinement of the optical wave along the periodic structure in a range of wavelengths. The range of wavelengths that will be confined by the periodic structure depends on the period 532 of the periodic structure. The columnar structures 530a-530c of the periodic structure that are proximate the tapered structure of second portion 520 have a transition length 538. The transition length is a length needed for a transition of the optical wave from a normal guided mode to a subwavelength grating mode. In various embodiments, the period 532 can be between 100-300 nm; however, embodiments of the present disclosure are not limited to columnar structures 530 having a period 532 falling within the foregoing range. For example, in other embodiments, the columnar structures 530 have a period 532 that is above or below the foregoing range.

In accordance with the embodiment of FIGS. 5A-5B, the periodic structure of columnar structures 530a-530f alters the optical characteristic of the tapered structure by trapping the optical wave in a specific range of wavelengths based on the period 532 and dimensions of the columns 530a-530f. The trapped optical wave, that is also known as a standing wave, increases an interaction between the optical wave and the material of the second portion 520. In this fashion, the interaction can be defined as a resonance of the optical wave between columns 530a-530f. The resonance can increase number of incidents of the optical wave interacting with the materials of the columns 530a-530f. Thus, increasing the number of incidents increases the interaction and enhances the absorption of the optical wave by of the second portion, thereby altering the optical characteristics of the tapered structure of the second portion. In addition, the target range of wavelengths that can be trapped can be changed by adjusting the period 532 and dimensions of the periodic structure of columnar structures 530a-530f. In this fashion, portions of the optical wave have a leakage in accordance with the tapered shape tip in second portion 520. The periodic structure traps the leaked optical wave as well as a portion of the optical wave that is confined at the tip in a guided mode. The columns 530a-530f produce an effective medium with an effective refractive index. The effective refractive index is produced based on a plurality of destructive and constructive reflections of the optical wave between the columns 530a-530f. The effective refractive index depends on the periodic structure dimensions. Thus, the effective refractive index of the periodic structure in second portion 520 can trap the leakage of the optical wave as an effective core with an effective refractive index. The trapped optical wave then is absorbed with the columns of the periodic structure. An excessive optical wave that is not absorbed, can propagate along the first axis x with the periodic structure in a sub-wavelength grating mode. This structure reduces the reflection of the optical wave to the first portion 510. Therefore, the termination efficiency is enhanced due to the reflection reduction as well as the absorption enhancement.

In some examples, the periodic structure of columnar structures 530a-530f may be formed by one or more patterning and etching process of the second portion 520. For instance, the patterning process can involve any suitable photolithographic patterning technique employing positive or negative photoresists and the etching process may include any suitable etching technique such as wet etching, dry etching, RIE, ashing, and/or other etching methods. In some embodiments, a dry etching process may implement an oxygen containing gas, a fluorine-containing gas (e.g., $CF_4$, SF, CH, $F_2$, $CHF_3$, and/or $C_2F_6$), a chlorine-containing gas (e.g., $Cl_2$, $CHCl_3$, $CCl_4$, and/or $BCl_z$), a bromine-containing gas (e.g., HBr and/or $CHBr_3$), an iodine-containing gas, other suitable gases and/or plasmas, and/or combinations thereof. In addition, a wet etching process may include etching in diluted hydrofluoric acid (DHF); potassium hydroxide (KOH) solution; ammonia; a solution containing hydrofluoric acid (HF), nitric acid ($HNO_3$), and/or acetic acid ($CH_3COOH$); or other suitable wet etchants. In some examples, the etching process may include an anisotropic etching such as plasma etching.

In various embodiments, the tapered structure and the periodic structure of the second portion 520 can be doped with a material as describe in embodiment of FIGS. 1A-B. In this fashion the absorption rate of the second portion is increased and consequently the efficiency of termination is enhanced. In some examples, the tapered structure of the second portion 520 can be a multi-layer structure as described for the second portion 220 of the embodiment in FIGS. 2A-B. In addition, the first portion 510 and the second portion 520 may include a cladding structure described in embodiments of FIGS. 4A-5B.

FIG. 6A is a schematic top plan view of the tapered structure described in FIG. 1B. The tapered structure is shown for a comparison with a dimension of the structure that is described in FIG. 6B. The dimensions of the tapered structure in FIG. 6A can be the same as the second portion 120 in FIG. 1A.

FIG. 6B is a top plan view of an alternative shape for the optical waveguide termination device of the embodiments of FIGS. 1A-5B. In some embodiments, the tapered shape structure has undulating boundaries in the second axis y. Providing these undulating boundaries is another example of a technique for altering the optical characteristics of a tapered structure such as the tapered structure illustrated in FIG. 6A. An undulating line is longer than a straight line in a same distance. Hence, a tapered structure with an undulating tip has a longer surface compared with a tapered structure where the tip includes straight sides such as the tapered structures illustrated in FIGS. 1A-5B. A longer surface of the tip increases leakage of the optical wave from the termination structure and consequently enhances the termination efficiency of the termination structure. The undulating shape of the termination structure can be used for each of the embodiments of FIGS. 1A-5B described above. In some examples, the boundary of the tapered shaped structure can be any type of non-straight lines. In this fashion, non-straight lines increase the scattering probability of the optical modes propagating with various phases and incident angles inside the core. In some examples, the undulating boundaries may be formed by one or more patterning and etching process as described above in FIG. 5B. In this fashion, the etching process may include an anisotropic etching such as plasma etching. The anisotropic etching may remove the majority of the horizontal portions of the tapered structure in the second axis y, while vertical portions of the tapered structure in the third axis z remain unchanged.

Figure 7B:
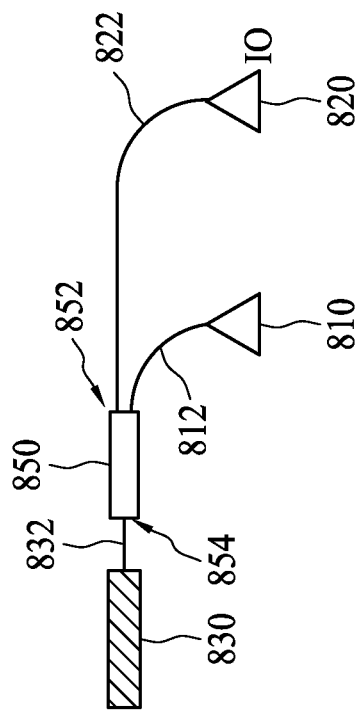
FIG. 7A-B are configurations of two systems for testing optical waveguide termination devices of the FIGS. 1A-6B, in accordance with some embodiments.
Figure 7A:
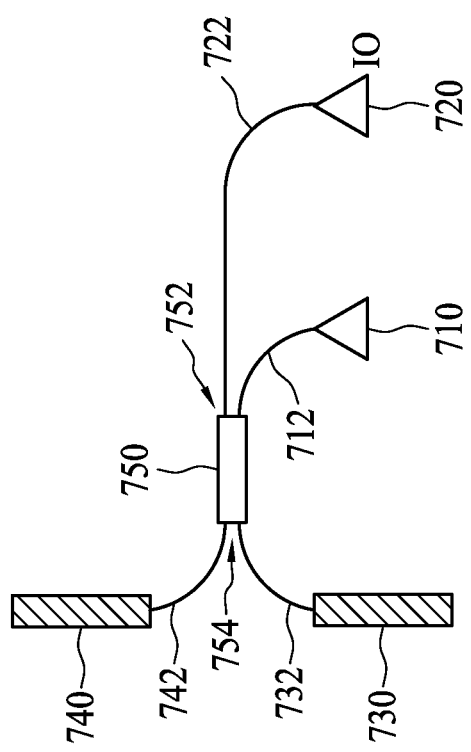

FIG. 7A is a system for measuring termination effectiveness or efficiency of optical waveguide termination devices, such as those described above with reference to FIGS. 1A-6B, in accordance with some embodiments. In the embodiment illustrated in FIG. 7A, an efficiency of two termination devices can be measured simultaneously. The efficiency of the termination device at terminating an optical wave propagating in an optical waveguide can be measured based on the reflection of the optical wave from the termination devices. In FIG. 7A, a splitter is used to guide an incoming optical wave into the termination devices and guide a reflected portion of the optical wave from the termination devices into an output to be measured.

In FIG. 7A, a first grating coupler 710 is coupled to a first end of a first optical waveguide 712. A second grating coupler 720 is coupled to a first end of a second optical waveguide 722. A first termination device 730 is coupled to a first end of a third optical waveguide 732. A second termination device 740 is coupled to a first end of a fourth optical waveguide 742. A splitter 750 includes a first side 752 and a second side 754. The first side 752 of the splitter 750 is coupled to second ends of the first and second optical waveguides 712, 722. The second side 754 of the splitter 750 is coupled to second ends of the third and fourth optical waveguides 732, 742.

The first termination device 730 and the second termination device 740 can be the termination devices described above with reference to FIGS. 1A-6B. To test termination devices 730 and 740, an optical wave is coupled to the first optical waveguide 712 with the first grating coupler 710. The splitter 750 splits the incoming optical wave into two equal portions. A first portion of the optical wave is coupled to the third optical waveguide 732 and a second portion of the optical wave is coupled to the fourth optical waveguide 742. The first termination device 730 and the second termination device 740 reflect a portion of the optical wave based on the termination efficiency of the termination devices. The reflected optical waves are combined inside the splitter 750. Based on a topology of the splitter and the optical waveguides, a constructive interference is guided to the second optical waveguide 722 while a destructive interference is guided to the first optical waveguide 712. Thus, the reflected optical wave is totally guided to an output port with the grating coupler 720.

In some embodiments, the splitter 750 is a directional coupler. The directional coupler includes four ports, two of them in the first side 752 and two others in the second side 754. In some examples, a length of the first optical waveguide 712 is different than a length of the second optical waveguide 722. A difference between the lengths of the first and second optical waveguides can be designed to create a desired interference. In this fashion, the length of the first optical waveguide 712 is designed to create a destructive interference of the reflected optical waves at the first grating coupler 710. In contrast, the length of the second optical waveguide 722 is designed to create a constructive interference of the reflected optical waves at the second grating coupler 720.

FIG. 7B illustrates another embodiment of a system for measuring an effectiveness or efficiency of an optical waveguide termination device, such as the optical waveguide termination devices of FIGS. 1A-6B, in accordance with some embodiments. In the system of FIG. 7B, an efficiency of a termination device can be measured based on a reflection of the optical wave from the termination device. In FIG. 7B, a splitter is used to guide an incoming optical wave into the termination device and guide the reflected portion of the optical wave from the termination device into an output to be measured.

In FIG. 7B, a first grating coupler 810 is coupled to a first end of a first optical waveguide 812. A second grating coupler 820 is coupled to a first end of a second optical waveguide 822. A termination device 830 is coupled to a first end of a third optical waveguide 832. A splitter 850 includes a first side 852 and a second side 854. The first side 852 is coupled to second ends of the first and second optical waveguides 812, 822. The second side 854 is coupled to a second end of the third optical waveguide 832.

In various embodiments, the termination device 830 can be any of the termination devices described above with reference to FIGS. 1A-6B. In operation, an optical wave is coupled to the first optical waveguide 812 with the first grating coupler 810. The splitter 850 couples the incoming optical wave into the third optical waveguide 832. The termination device 830 reflects a portion of the optical wave based on the termination efficiency of the termination device. The reflected optical wave is split by the splitter 850 into two equal portions of waves. A half portion of the reflected optical wave is guided to the second optical waveguide 822 to be measured.

In some embodiments, the splitter 850 is a Y-junction coupler. The Y-junction coupler includes three ports, two of them in the first side 852 and one port in the second side 854. In this fashion the optical wave coupled to the grating coupler 820 is half of the reflected optical wave. However, a dimension of the measurement setup is reduced compared with the configuration described in FIG. 7A.

Figure 8:
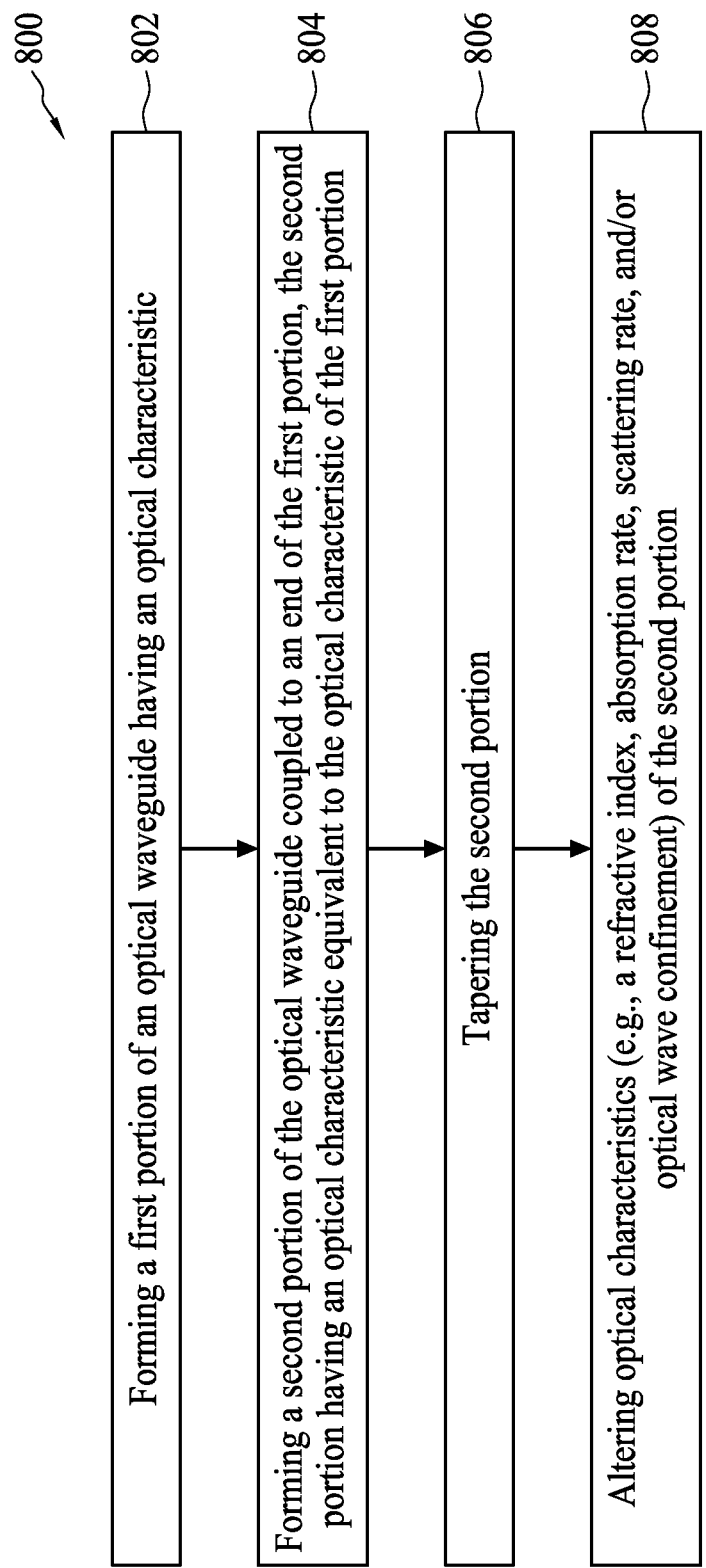
FIG. 8 is a flow chart of a method of forming an optical waveguide with a termination structure in accordance with some embodiments.

FIG. 8 is a flow chart of a method 800 in accordance with embodiments of the present disclosure for forming a termination device. The method of FIG. 8 includes a first operation 802 of forming a first portion of an optical waveguide that has a first length along a first direction, a first width along a second direction that is transverse to the first direction, and a first height along a third direction that is transverse to the first direction. The first portion has an optical characteristic (e.g., a refractive index, absorption rate, scattering rate, and/or optical wave confinement). In some examples, the optical waveguide may be formed by a deposition process, such as CVD, PVD, ALD, HDPCVD, MOCVD, RPCVD, PECVD, LPCVD, ALCVD, APCVD, or combinations thereof. In some implementations, the optical waveguide is formed by a flowable CVD (FCVD) process that includes, for example, depositing a flowable material (such as a liquid compound) over a substrate and converting the flowable material to a solid material by a suitable technique, such as thermal annealing and/or ultraviolet radiation treating. In some embodiments, after deposition of the optical waveguide, the deposited dielectric material patterned using photolithography processes and may be thinned and planarized, for example, by a chemical mechanical polishing (CMP) process.

Method 800 includes a next operation 804 of forming a second portion of the optical waveguide having a second length along the first direction, a second width along the second direction, and a second height along the third direction, the second portion having a tapered profile along the first direction. The second portion of the optical waveguide may be formed by the same methods described in operation 802. In some examples, the second portion of the optical waveguide may be formed separately and fused to the first portion in another step. In some embodiments, the second portion may be a part of the optical waveguide that forms the first portion. The portion has an optical characteristic (e.g., a refractive index, absorption rate, scattering rate, and/or optical wave confinement).

In a third operation 806, the second portion is tapered to form a tip as described in FIGS. 1A-6B. In some examples, the second portion may be tapered by one or more photolithographic patterning and etching processes. For instance, the etching process may include any suitable etching technique such as wet etching, dry etching, RIE, ashing, and/or other etching methods. In some embodiments, a dry etching process may implement an oxygen containing gas, a fluorine-containing gas (e.g., $CF_4$, SF, CH, $F_2$, $CHF_3$, and/or $C_2F_6$), a chlorine-containing gas (e.g., $Cl_2$, $CHCl_3$, $CCl_4$, and/or $BCl_z$), a bromine-containing gas (e.g., HBr and/or CHBR3), an iodine-containing gas, other suitable gases and/or plasmas, and/or combinations thereof. In addition, a wet etching process may include etching in diluted hydrofluoric acid (DHF); potassium hydroxide (KOH) solution; ammonia; a solution containing hydrofluoric acid (HF), nitric acid ($HNO_3$), and/or acetic acid ($CH_3COOH$); or other suitable wet etchants. In some examples, the etching process may include an anisotropic etching such as plasma etching.

In last operation 808, the optical characteristic of the second portion is changed or altered to be different than the optical characteristic of the first portion. In this fashion, the optical characteristic of the second portion may include a refractive index, absorption rate, scattering rate, and/or optical wave confinement, in accordance with the embodiments described above in FIGS. 1A-6B. For instance, an effective refractive index and absorption rate of the second portion may be altered by the doping process described in FIGS. 1A-C and/or by the multi-layer structure described in FIGS. 2A-E. In addition, scattering rate and optical wave confinement of the second portion may be altered by the cladding structure described in FIGS. 3A-4B, by the periodic structure described in FIGS. 5A-B, and/or by the undulating structure described in FIG. 6B.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A device, comprising:
an optical waveguide, the optical waveguide comprising a core that includes:
a first portion having a first length along a first direction, a first width along a second direction that is transverse to the first direction, and a first thickness along a third direction that is transverse to the first and second directions; and
a second portion having a first end of the first width and a second end with the first end laterally contacting the first portion and extending from the first portion along the first direction, the second portion having a second length along the first direction, a second width along the second direction progressively decreasing from the first end to the second end, and a uniform second thickness along the third direction equal to the first thickness, the second portion having a tapered profile in the first direction,
wherein the second portion comprises a material different from the first portion.

2. The device of claim 1, wherein the second portion is a doped semiconductor portion including N-type or P-type dopants, and the first portion is an undoped semiconductor portion.

3. The device of claim 2, wherein the second portion has a greater optical absorption than the first portion.

4. The device of claim 1, wherein the first portion includes a first material, and the second portion includes the first material and a second material, the second material disposed on a surface of the first material along the third direction.

5. The device of claim 4, wherein the second material has an electrical bandgap less than an electrical bandgap of the first material.

6. The device of claim 5, wherein the second material is a metallic silicide or germanium.

7. The device of claim 1, wherein the optical waveguide further comprises a first cladding at least partially surrounding the first portion of the core and a second cladding at least partially surrounding the second portion of the core, wherein the first cladding is formed of a different material than the second cladding.

8. The device of claim 7, wherein the second cladding includes a plurality of dielectric layers arranged along the first direction, each of the plurality of dielectric layers having a dielectric constant different from a dielectric constant of others of the plurality of dielectric layers.

9. The device of claim 8, wherein the dielectric constant of adjacent ones of the plurality of dielectric layers is decreased along the first direction.

10. The device of claim 1, wherein the second portion further includes a periodic structure, the periodic structure has a plurality of columnar elements arranged in the first direction.

11. A method, comprising:
forming a first portion of a core of an optical waveguide that has a first length along a first direction, a uniform first width along a second direction that is transverse to the first direction, and a uniform first thickness along a third direction that is transverse to the first and second directions, the first portion having an optical characteristic; and
forming a second portion of the core of the optical waveguide, the second portion having a first end of the first width and a second end with the first end laterally contacting the first portion and extending from the first portion along the first direction, the second portion having a second length along the first direction, a second width along the second direction progressively decreasing from the first end to the second end, and a uniform second thickness along the third direction equal to the first thickness, the second portion having a tapered profile along the first direction,
wherein the second portion comprises a material different from the first portion such that the second portion has a different optical characteristic than the first portion.

12. The method of claim 11, wherein forming the second portion comprises:
doping the second portion with N-type or P-type dopants.

13. The method of claim 11, wherein the second portion comprises a first layer of a first material and a second layer of a second material over the first layer, wherein the first portion includes the first material, and the second material has a greater optical absorption than the first material.

14. The method of claim 11, further comprising forming a first cladding at least partially surrounding the first portion of the core and forming a second cladding, of a material different than the first cladding, at least partially surrounding the second portion of the core.

15. The method of claim 14, wherein the second cladding includes a plurality of dielectric layers with different dielectric constants, arranged along the first direction.

16. The method of claim 11, further comprising forming a first cladding at least partially surrounding the first portion of the core and forming a second cladding at least partially surrounding the second portion of the core, wherein the first cladding and the second cladding comprise a low-k material.

17. The method of claim 11, further comprising forming a periodic structure along the first direction, wherein the periodic structure has a plurality of columnar elements arranged in the first direction and overlapping the second portion.

18. A device comprising an optical waveguide, the optical waveguide comprising a core that includes:
an end structure having a uniform width and a uniform thickness; and
a tapered structure laterally contacting the end structure and extending from the end structure along a longitudinal axis of the optical waveguide, wherein the taper structure comprises a lower portion and an upper portion over the lower portion, the lower portion and the upper portion comprising different materials, and wherein the tapered structure has a uniform thickness that is equal to the thickness of the end structure.

19. The device of claim 18, wherein the lower portion comprises a first semiconductor material, and the upper portion comprises a second semiconductor material different from the first semiconductor material.

20. The device of claim 18, wherein the lower portion comprises a semiconductor material, and the upper portion comprises a metal or a silicide of the semiconductor material.

* * * * *